United States Patent
Bursell et al.

(10) Patent No.: US 9,268,588 B2
(45) Date of Patent: Feb. 23, 2016

(54) OPTIMIZING VIRTUAL MACHINE MIGRATION VIA IDENTIFICATION AND TREATMENT OF VIRTUAL MEMORY SWAP FILE

(71) Applicant: Citrix Systems, Inc., Fort Lauderdale, FL (US)

(72) Inventors: Michael Hingston McLaughlin Bursell, Halstead (GB); David Jonathan Scott, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 303 days.

(21) Appl. No.: 13/897,935

(22) Filed: May 20, 2013

(65) Prior Publication Data

US 2014/0344807 A1    Nov. 20, 2014

(51) Int. Cl.
| | |
|---|---|
| *G06F 9/455* | (2006.01) |
| *G06F 9/48* | (2006.01) |
| *G06F 9/50* | (2006.01) |

(52) U.S. Cl.
CPC ........ *G06F 9/45545* (2013.01); *G06F 9/45558* (2013.01); *G06F 9/4856* (2013.01); *G06F 9/5077* (2013.01); *G06F 2009/4557* (2013.01); *G06F 2009/45583* (2013.01)

(58) Field of Classification Search
CPC .............. G06F 2009/4557; G06F 2009/45583; G06F 9/45545; G06F 9/45558; G06F 9/4856; G06F 9/5077
See application file for complete search history.

(56) References Cited

U.S. PATENT DOCUMENTS

| | | | |
|---|---|---|---|
| 8,799,554 B1* | 8/2014 | Vincent et al. ..................... 711/6 |
| 2009/0063750 A1* | 3/2009 | Dow ........................ G06F 12/08 |
| | | | 711/6 |
| 2009/0063753 A1* | 3/2009 | Dow ......................... G06F 8/61 |
| | | | 711/6 |
| 2009/0064136 A1* | 3/2009 | Dow et al. ......................... 718/1 |
| 2009/0265506 A1* | 10/2009 | Yim ....................... G06F 3/0605 |
| | | | 711/103 |
| 2010/0023565 A1 | 1/2010 | Colbert et al. |
| 2011/0010515 A1* | 1/2011 | Ranade ................ G06F 11/1451 |
| | | | 711/162 |
| 2011/0066597 A1 | 3/2011 | Mashtizadeh et al. |
| 2012/0221710 A1* | 8/2012 | Tsirkin .................. G06F 9/5077 |
| | | | 709/224 |

(Continued)

OTHER PUBLICATIONS

International Search Report and Written Opinion of International Application No. PCT/US2014/038177, mailed Aug. 26, 2014.

*Primary Examiner* — Meng An
*Assistant Examiner* — James J Lee
(74) *Attorney, Agent, or Firm* — Banner & Witcoff, Ltd.

(57) ABSTRACT

A virtualization computing platform may host a virtual machine. The virtual machine may be hosted by a first set of resources of the virtualization computing platform. A second set of resources for hosting the virtual machine may be identified. The second set of resources may comprise resources of the virtualization computing platform that are distinct from the first set of resources. At least a portion of a plurality of files associated with the virtual machine may be copied from the first set of resources to the second set of resources. A virtual memory swap file may be identified from among the plurality of files associated with the virtual machine. Based on identifying the virtual memory swap file as a virtual memory swap file, the virtual memory swap file may be treated differently from one or more other of the plurality of files associated with the virtual machine.

36 Claims, 8 Drawing Sheets

(56) References Cited

U.S. PATENT DOCUMENTS

| | | | |
|---|---|---|---|
| 2012/0324443 A1* | 12/2012 | Low et al. ........................ 718/1 | |
| 2013/0054813 A1* | 2/2013 | Bercovici ............ G06F 9/45533 709/226 | |
| 2013/0081015 A1* | 3/2013 | Noma ................. G06F 9/45558 718/1 | |
| 2013/0290628 A1* | 10/2013 | Hayashi ................ G06F 3/0611 711/114 | |
| 2014/0068207 A1* | 3/2014 | Aslot ...................... G06F 12/12 711/160 | |

\* cited by examiner

OPTIMIZING VIRTUAL MACHINE MIGRATION VIA IDENTIFICATION AND TREATMENT OF VIRTUAL MEMORY SWAP FILE

FIELD

This application generally relates to computer virtualization and virtual memory-management. In particular, this application relates to virtual machine migration.

BACKGROUND

Virtual machines are widely utilized for both consumer and enterprise applications. Consumers prefer virtual machines because they offer a secure and simple alternative to local customized installations, which may prove technically demanding or vulnerable to malicious software. Administrators often opt to deploy virtual machines due to their scalability, security, and platform-agnostic accessibility.

Like traditional computing platforms, the operating systems of virtual machines often utilize one or more memory-management schemes (e.g., paging). These memory-management schemes allow an operating system to use secondary-storage (e.g., a hard disk) to store data that would otherwise occupy space in memory (e.g., RAM). Many modern operating systems extensively leverage one or more memory-management schemes.

In the context of virtual machines, the extensive use of memory-management schemes has implications. For example, a memory-management scheme may utilize one or more files to store data and/or pointers (e.g., addresses) to data temporarily stored elsewhere. Migrating a virtual machine (e.g., to achieve one or more load balancing goals) may or may not require copying a portion of this data from one set of resources to another. If unnecessary copying is performed, critical resources (e.g., time) may be needlessly consumed.

Accordingly, a need exists for optimized virtual machine migration.

SUMMARY

In light of the foregoing background, the following presents a simplified summary of the present disclosure in order to provide a basic understanding of some aspects described herein. This summary is not an extensive overview, and it is not intended to identify key or critical elements or to delineate the scope of the claims. The following summary merely presents various described aspects in a simplified form as a prelude to the more detailed description provided below.

According to one or more aspects described herein, a virtualization computing platform may host a virtual machine. The virtual machine may be hosted by a first set of resources of the virtualization computing platform. A second set of resources for hosting the virtual machine may be identified. The second set of resources may comprise resources of the virtualization computing platform that are distinct from the first set of resources. At least a portion of a plurality of files associated with the virtual machine may be copied from the first set of resources to the second set of resources. A virtual memory swap file may be identified from among the plurality of files associated with the virtual machine. Based on identifying the virtual memory swap file as a virtual memory swap file, the virtual memory swap file may be treated differently from one or more other of the plurality of files associated with the virtual machine.

In some embodiments, a current utilization of the virtual memory swap file may be determined. Determining the current utilization of the virtual memory swap file may include making one or more application program interface (API) calls to an operating system (OS) of the virtual machine. In some embodiments, determining the current utilization of the virtual memory swap file may include determining that the virtual memory swap file is currently unutilized. In such embodiments, treating the virtual memory swap file differently from the one or more other of the plurality of files associated with the virtual machine may include, based on determining that the virtual memory swap file is currently unutilized, copying the one or more other of the plurality of files associated with the virtual machine to the second set of resources and failing to copy the virtual memory swap file to the second set of resources. Additionally or alternatively, treating the virtual memory swap file differently from the one or more other of the plurality of files associated with the virtual machine may include, based on determining that the virtual memory swap file is currently unutilized, delaying copying of the virtual memory swap file to the second set of resources until the one or more other of the plurality of files associated with the virtual machine have been copied to the second set of resources.

In some embodiments, a historical utilization of the virtual memory swap file may be determined. Determining the historical utilization of the virtual memory swap file may include making one or more API calls to an OS of the virtual machine. In some embodiments, determining the historical utilization of the virtual memory swap file may include determining that the virtual memory swap file has recently been unutilized. In such embodiments, treating the virtual memory swap file differently from the one or more other of the plurality of files associated with the virtual machine may include, based on determining that the virtual memory swap file has recently been unutilized, copying the one or more other of the plurality of files associated with the virtual machine to the second set of resources and failing to copy the virtual memory swap file to the second set of resources. Additionally or alternatively, treating the virtual memory swap file differently from the one or more other of the plurality of files associated with the virtual machine may include, based on determining that the virtual memory swap file has recently been unutilized, delaying copying of the virtual memory swap file to the second set of resources until the one or more other of the plurality of files associated with the virtual machine have been copied to the second set of resources.

In some embodiments, a utilized portion of the virtual memory swap file and an unutilized portion of the virtual memory swap file may be identified. In such embodiments, treating the virtual memory swap file differently from the one or more other of the plurality of files associated with the virtual machine may include: copying the one or more other of the plurality of files associated with the virtual machine to the second set of resources, copying the utilized portion of the virtual memory swap file to the second set of resources, and failing to copy the unutilized portion of the virtual memory swap file to the second set of resources.

In some embodiments, the virtual machine may be signaled that the at least a portion of the plurality of files associated with the virtual machine are to be copied from the first set of resources to the second set of resources. Signaling the virtual machine that the at least a portion of the plurality of files associated with the virtual machine are to be copied from the first set of resources to the second set of resources may include signaling a virtual memory swap file agent process executing on the virtual machine. Responsive to the signaling, the virtual machine may take one or more steps to reduce utilization of the virtual memory swap file.

In some embodiments, a message may be received from the virtual machine. In some embodiments, the message may indicate that the virtual memory swap file is not currently being utilized. In such embodiments, treating the virtual memory swap file differently from the one or more other of the plurality of files associated with the virtual machine may include, based on the message indicating that the virtual memory swap file is not currently being utilized, copying the one or more other of the plurality of files associated with the virtual machine to the second set of resources and failing to copy the virtual memory swap file to the second set of resources. In some embodiments, the message may indicate a predicted duration that the virtual memory swap file will continue to be utilized. In such embodiments, treating the virtual memory swap file differently from the one or more other of the plurality of files associated with the virtual machine may include, based on the message indicating the predicted duration that the virtual memory swap file will continue to be utilized, delaying copying of the virtual memory swap file to the second set of resources for at least the predicted duration that the virtual memory swap file will continue to be utilized.

In some embodiments, a first and second message may be received from the virtual machine. The first message may be received before the second message. The first message may indicate that the virtual memory swap file is currently being utilized. The second message may indicate that the virtual memory swap file is no longer being utilized. In such embodiments, treating the virtual memory swap file differently from the one or more other of the plurality of files associated with the virtual machine may include: based on the first message, copying the one or more other of the plurality of files associated with the virtual machine to the second set of resources, and failing to copy the virtual memory swap file to the second set of resources until the second message is received.

In some embodiments, treating the virtual memory swap file differently from the one or more other of the plurality of files associated with the virtual machine may include: retaining a copy of the virtual memory swap file on the first set of resources; removing the one or more other of the plurality of files associated with the virtual machine from the first set of resources; and subsequent to removing the one or more other of the plurality of files associated with the virtual machine from the first set of resources, copying from the retained copy of the virtual memory swap file on the first set of resources, at least a portion of the virtual memory swap file to the second set of resources.

In some embodiments, one or more API calls may be made to an OS of the virtual machine. In such embodiments, treating the virtual memory swap file differently from the one or more other of the plurality of files associated with the virtual machine may include, based on at least one value returned by the one or more API calls, copying the one or more other of the plurality of files associated with the virtual machine to the second set of resource and failing to copy the virtual memory swap file to the second set of resources. Additionally or alternatively, treating the virtual memory swap file differently from the one or more other of the plurality of files associated with the virtual machine may include, based on at least one value returned by the one or more API calls, delaying copying of the virtual memory swap file to the second set of resources and failing to delay copying of the one or more other of the plurality of files associated with the virtual machine to the second set of resources. In some embodiments, at least one of the one or more API calls may be made by a swap file agent process executing on the virtual machine.

In some embodiments, treating the virtual memory swap file differently from the one or more other of the plurality of files associated with the virtual machine may include copying the one or more other of the plurality of files associated with the virtual machine to the second set of resources and failing to copy the virtual memory swap file to the second set of resources. Additionally or alternatively, treating the virtual memory swap file differently from the one or more other of the plurality of files associated with the virtual machine may include delaying copying of the virtual memory swap file to the second set of resources and failing to delay copying of the one or more other of the plurality of files associated with the virtual machine to the second set of resources.

BRIEF DESCRIPTION OF THE DRAWINGS

Figure 1:
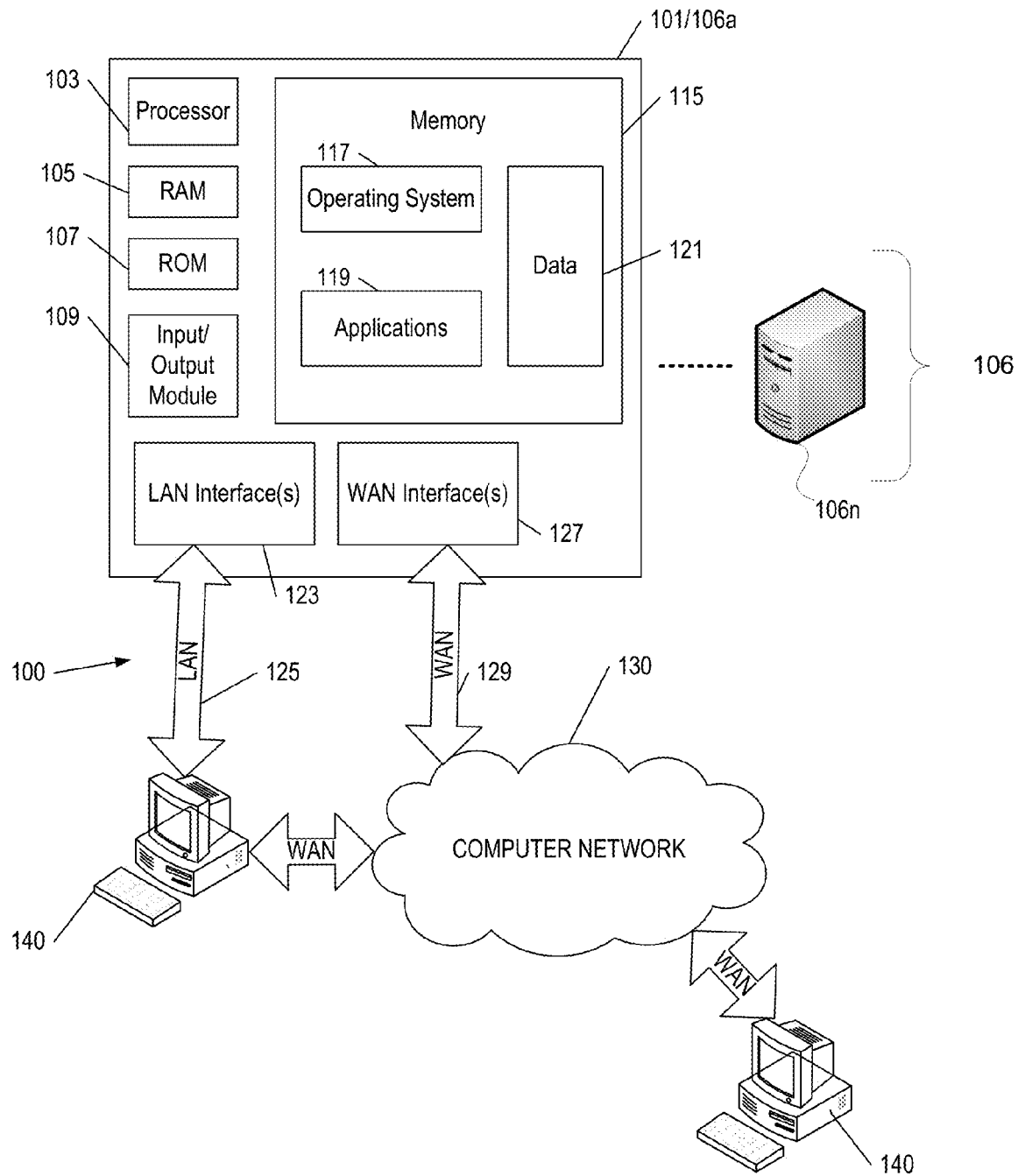
Figure 2:
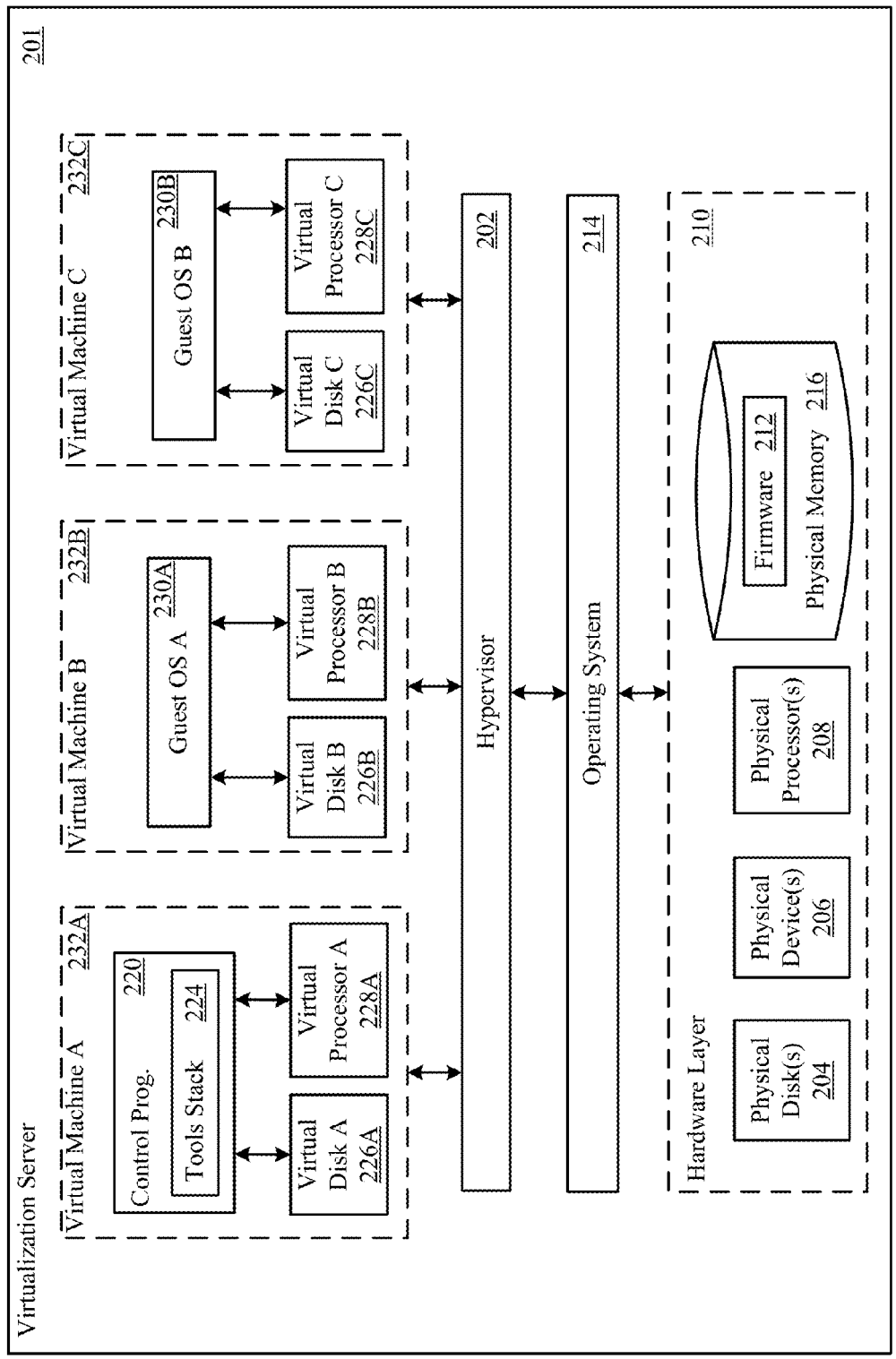
Figure 3:
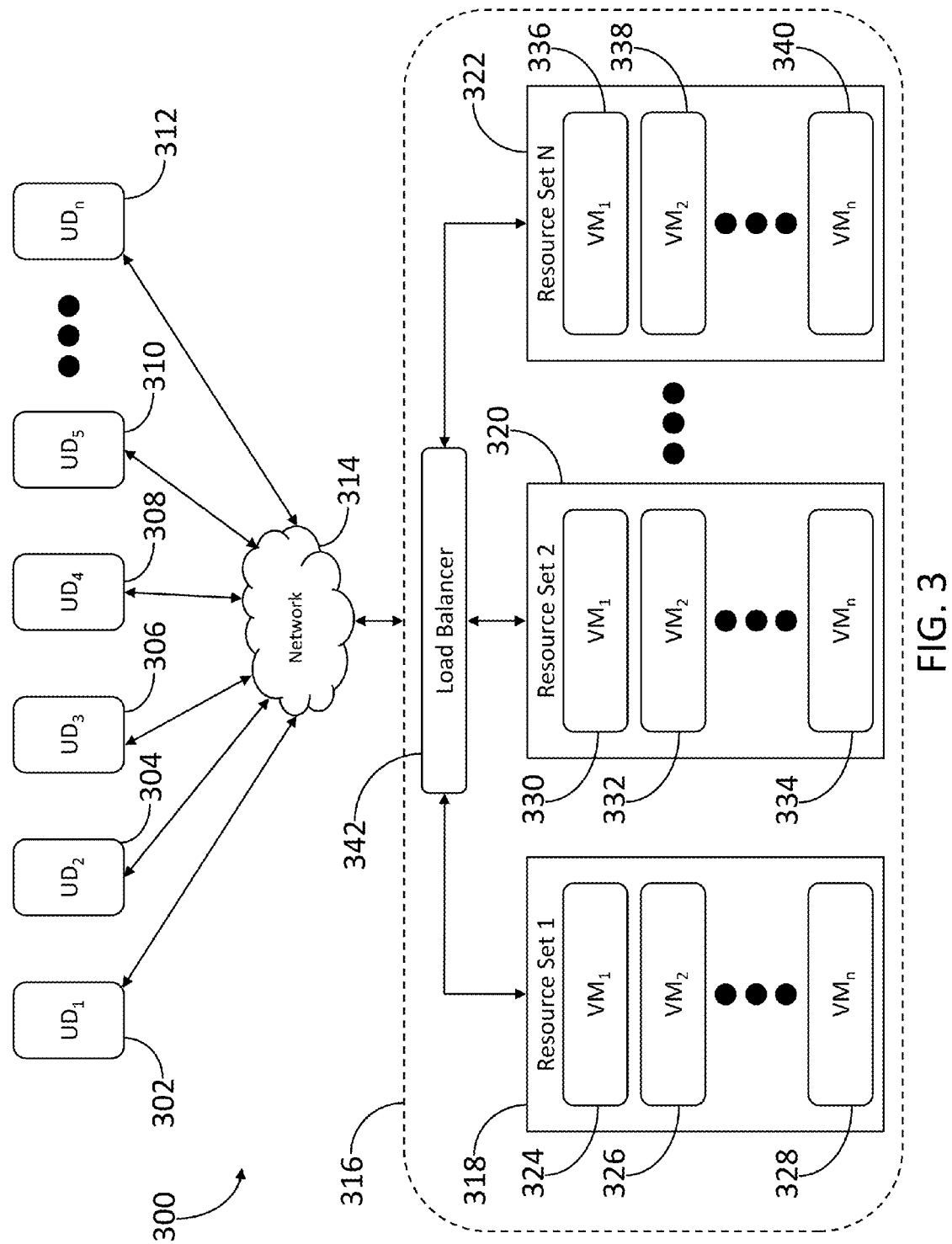
Figure 4A:
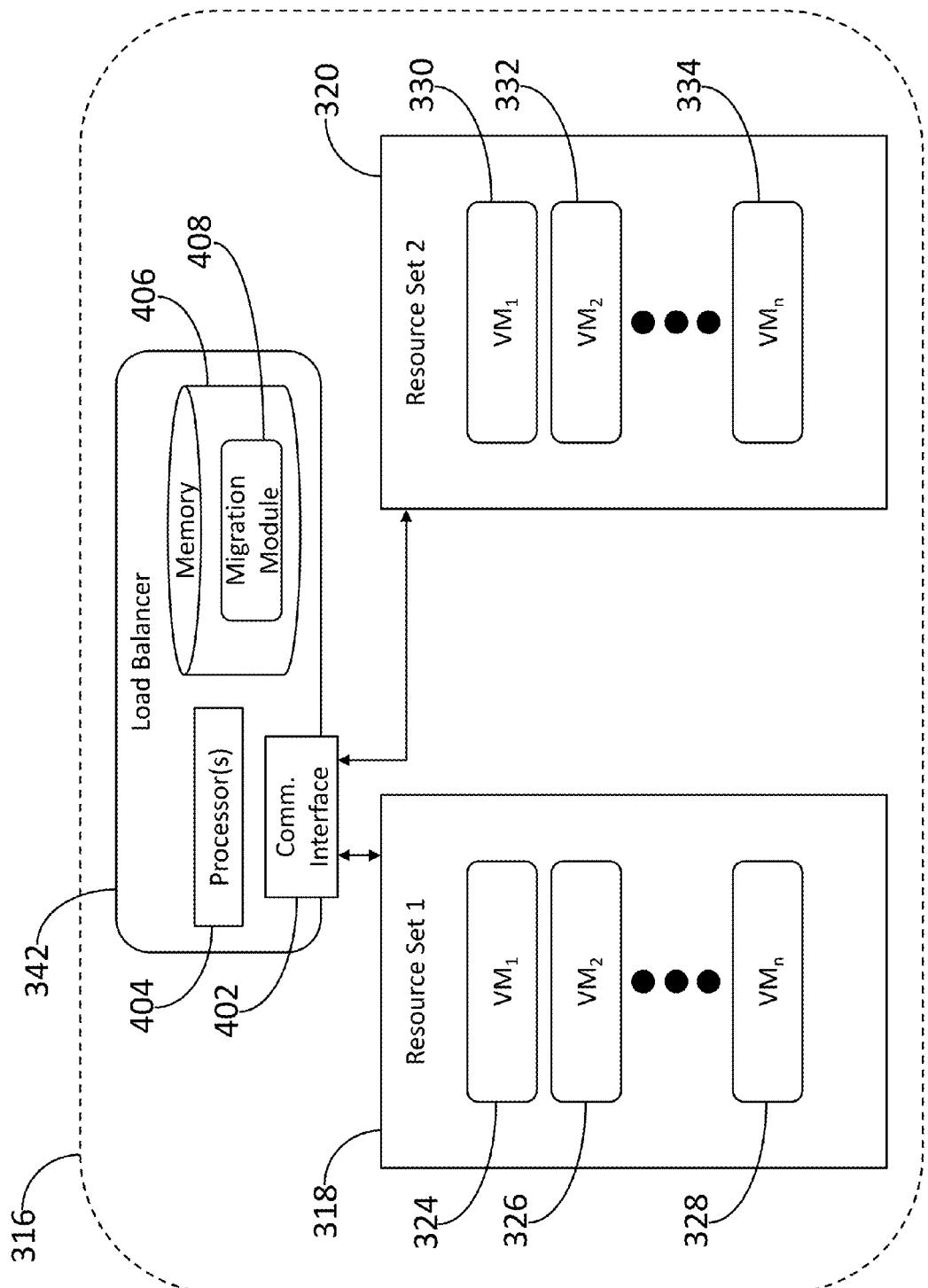
Figure 4B:
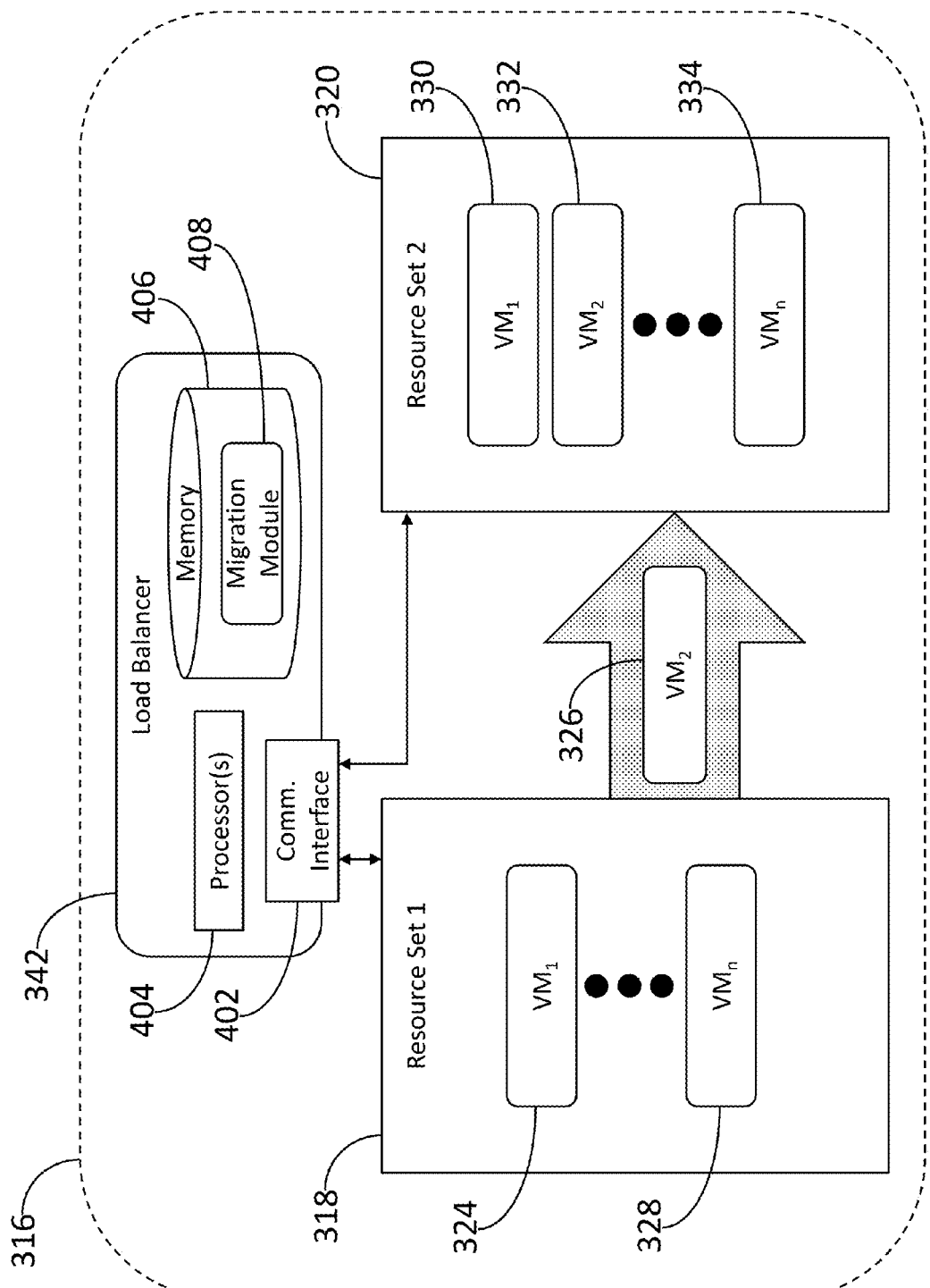
Figure 4C:
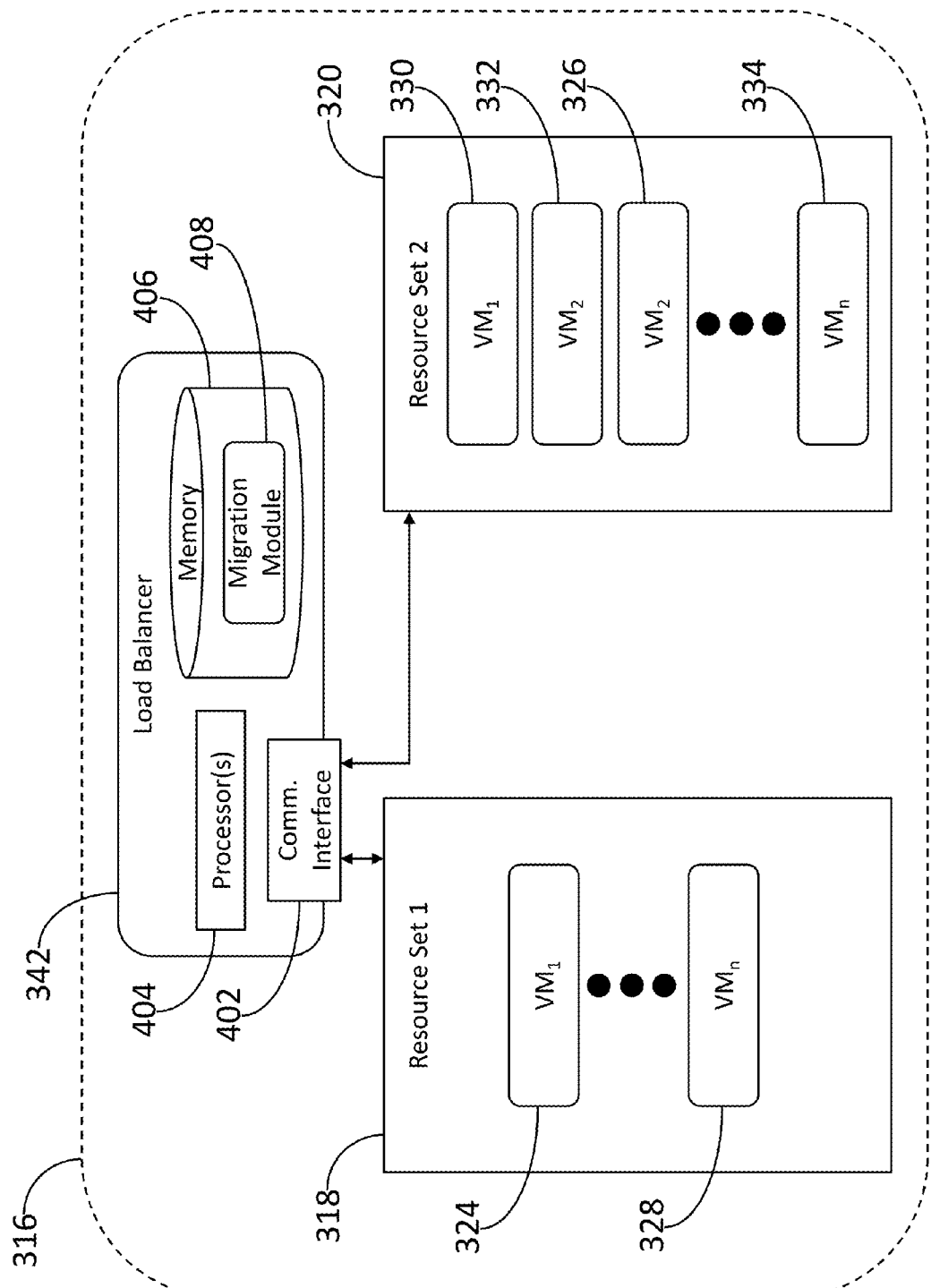
Figure 5:
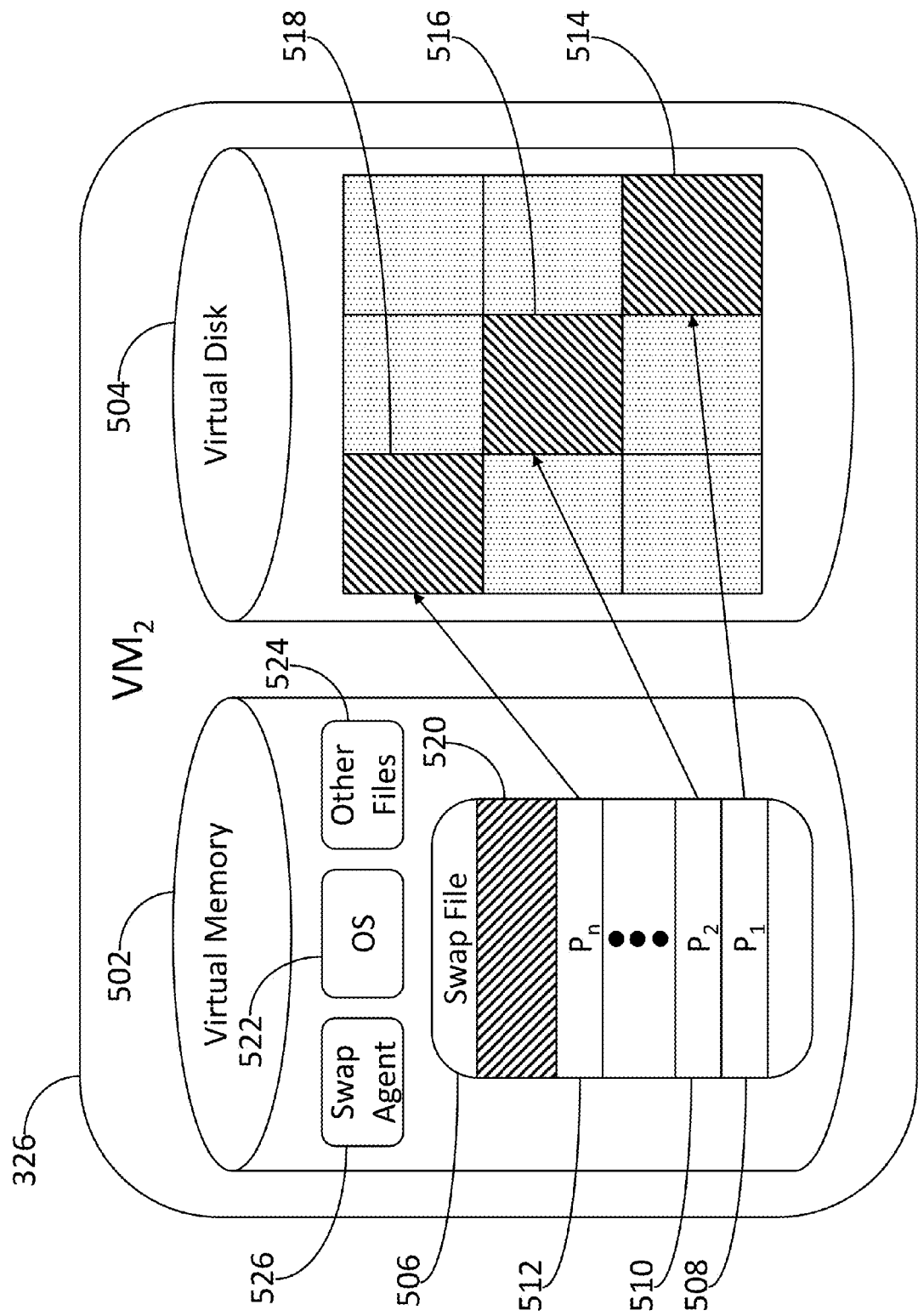
Figure 6:
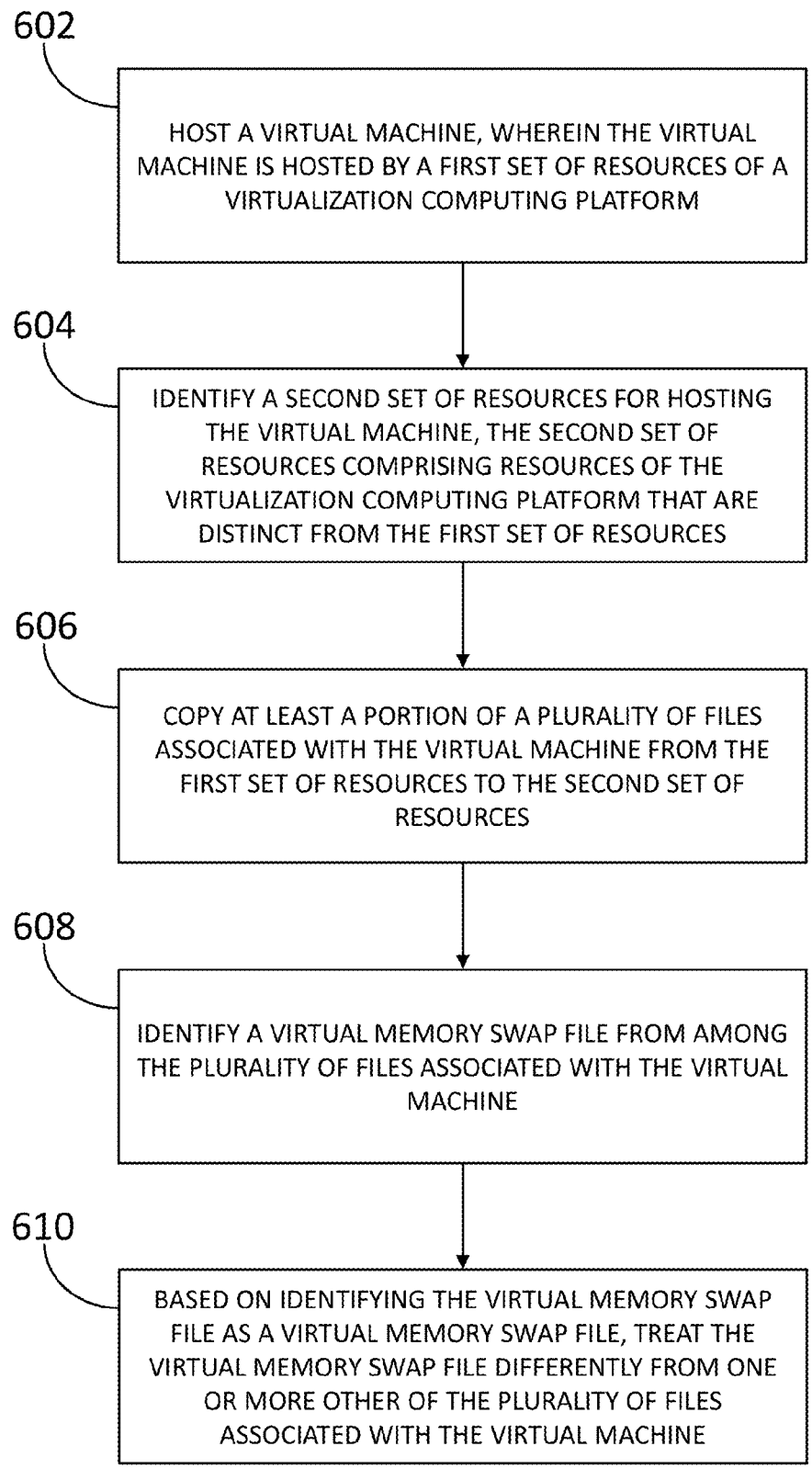

Having thus described aspects of the disclosure in general terms, reference will now be made to the accompanying drawings, which are not necessarily drawn to scale, and wherein:

FIG. 1 depicts an example operating environment in which various aspects of the disclosure may be implemented;

FIG. 2 depicts example embodiments of a virtualization server in accordance with one or more illustrative aspects described herein;

FIG. 3 depicts an example computing environment for performing optimized virtual machine migration in accordance with one or more illustrative aspects described herein;

FIGS. 4A, 4B, and 4C depict an example of optimized migration of a virtual machine in accordance with one or more illustrative aspects described herein;

FIG. 5 depicts an example virtual machine for optimized virtual machine migration in accordance with one or more illustrative aspects described herein; and FIG. 6 depicts an example method for optimized virtual machine migration in accordance with one or more illustrative aspects described herein.

DETAILED DESCRIPTION

In the following description of various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment, a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a virtual machine receiver program or application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106a-106n such that the servers 106a-106n are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106a-106n within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or MAC OS). In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. Some embodiments include a first server 106a that receives requests from a client machine 140, forwards the request to a second server 106n, and responds to the request generated by the client machine 140 with a response from the second server 106n. The first server 106a can acquire an enumeration of applications available to the client machine 140 as well as address information associated with an application server 106 hosting an application identified within the enumeration of applications. The first server 106a can then present a response to the client's request using a web interface, and communicate directly with the client 140 to provide the client 140 with access to an identified application.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Illustrated in FIG. 2 is one embodiment of a computer device 201 configured as a virtualization server in a virtualization environment, for example, a single-server, multi-server, or cloud computing environment. The virtualization server 201 illustrated in FIG. 2 can be deployed as and/or implemented by one or more embodiments of the server 106 illustrated in FIG. 1 or by other known computing devices. Included in virtualization server 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The virtualization server 201 may further include an operating system 214 that may be stored in a memory element in the physical memory 216 and executed by one or more of the physical processors 208. Still further, a hypervisor 402 may be stored in a memory element in the physical memory 216 and can be executed by one or more of the physical processors 208. Executing on one or more of the physical processors 208 may be one or more virtual machines 232A-C (generally 232). Each virtual machine 232 may have a virtual disk 226A-C and a virtual processor 228A-C. In some embodiments, a first virtual machine 232A may execute, on a virtual processor 228A, a control program 220 that includes a tools stack 224. In other embodiments, one or more virtual machines 232B-C may be executed, on a virtual processor 228B-C, a guest operating system 230A-B.

Further referring to FIG. 2, and in more detail, the virtualization server 201 may include a hardware layer 210 with one or more pieces of hardware that communicate with the virtualization server 201. In some embodiments, the hardware layer 210 can include one or more physical disks 204, one or more physical devices 206, one or more physical processors 208, and one or more memory 216. Physical components 204, 206, 208, and 216 may include, for example, any of the components described above with respect to FIG. 1. For instance, physical disks 204 may include permanent memory storage, temporary memory storage, disk drives (e.g., optical, floppy, tape), hard disks, external hard drives, flash memory, network-attached storage, a storage-area network, or any other storage repository that the virtualization server 201 can access. Physical devices 206 may include any device included in the virtualization server 201 and/or any combination of devices included in the virtualization server 201 and external devices that communicate with the virtualization server 201. A physical device 206 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201. The physical memory 216 in the hardware layer 210 may include any type of memory. The physical memory 216 may store data, and in some embodiments may store one or more programs, or set of executable instructions. FIG. 2 illustrates an embodiment where firmware 212 is stored within the physical memory 216 of the virtualization server 201. Programs or executable instructions stored in the physical memory 216 can be executed by the one or more processors 208 of the virtualization server 201.

Virtualization server 201 may also include a hypervisor 202. In some embodiments, hypervisor 202 may be a program executed by processors 208 on the virtualization server 201 to create and manage any number of virtual machines 232. The hypervisor 202 can be referred to as a virtual machine monitor, or platform virtualization software. In some embodiments, a hypervisor 202 can be any combination of executable instructions and hardware that monitors virtual machines executing on a computing machine. Hypervisor 202 may be a Type 2 hypervisor, or a hypervisor that executes within an operating system 214 executing on the virtualization server 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201 in a virtualization environment may include a Type 1 hypervisor (Not Shown). A Type 1 hypervisor may execute on the virtualization server 201 by directly accessing the hardware and resources within the hardware layer 210. That is, while a Type 2 hypervisor 202 accesses system resources through a host operating system 214, a Type 1 hypervisor may directly access all system resources without needing a host operating system 214. A Type 1 hypervisor may execute directly on one or more physical processors 208 of the virtualization server 201, and may include program data stored in the physical memory 216.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices 206; physical disks; physical processors; physical memory 216 and any other component included in the virtualization server 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the virtualization server 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 201 executes a hypervisor 202 that creates a virtual machine platform on which guest operating systems may execute. In these embodiments, the virtualization server 201 can be referred to as a host server. An example of such a virtualization server is the XEN SERVER provided by Citrix Systems, Inc., of Fort Lauderdale, Fla.

The hypervisor 202 may create one or more virtual machines 232B-C (generally 232) in which guest operating systems 230 execute. In some embodiments, the hypervisor 202 may load a virtual machine image to create a virtual machine 232. In other embodiments, the hypervisor 202 may execute a guest operating system 230 within the virtual machine 232. In still other embodiments, the virtual machine 232 may execute the guest operating system 230.

In addition to creating virtual machines 232, the hypervisor 202 may control the execution of at least one virtual machine 232. In other embodiments, the hypervisor 202 may present at least one virtual machine 232 with an abstraction of at least one hardware resource provided by the virtualization server 201 (e.g., any hardware resource available within the hardware layer 210). In other embodiments, the hypervisor 202 may control the manner in which virtual machines 232 access the physical processors 208 available in the virtualization server 201. Controlling access to the physical processors 208 may include determining whether a virtual machine 232 should have access to a processor 208, and how physical processor capabilities are presented to the virtual machine 232.

As shown in the example of FIG. 2, the virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device. While FIG. 2 illustrates an embodiment where a virtualization server 201 hosts three virtual machines 232, in other embodiments, the virtualization server 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202 may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, the hypervisor 202 may provide each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226, in some embodiments, is a virtualized view of one or more physical disks 204 of the virtualization server 201, or a portion of one or more physical disks 204 of the virtualization server 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the virtualization server 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

FIG. 3 depicts an example computing environment for performing optimized virtual machine migration in accordance with one or more illustrative aspects described herein. Referring to FIG. 3, computing environment 300 may include user devices 302, 304, 306, 308, 310, and 312. Two or more of user devices 302, 304, 306, 308, 310, and 312 may be interconnected via network 314, or a portion thereof. Network 314 may comprise one or more component networks (e.g., LANs, WANs, VLANs, etc.). Computing environment 300 may also include virtualization platform 316. One or more of user devices 302, 304, 306, 308, 310, and 312 may be connected to virtualization platform 316 via network 314, or a portion thereof.

Virtualization platform 316 may comprise one or more resources, any portion of which may be geographically concentrated or dispersed as desired. For example, virtualization platform 316 may include resource sets 318, 320, and 322. One or more of resource sets 318, 320, and 322 may include one or more resources (e.g., hardware resources, software resources, firmware resources, network resources, or the like, such as those described above with respect to FIGS. 1 and 2) utilized to create and/or host a plurality of virtual computing environments. For example, resource set 318 may include one or more resources utilized to create and/or host virtual machines 324, 326, and 328. Similarly, resource set 320 may include one or more resources utilized to create and/or host virtual machines 330, 332, and 334; and resource set 322 may include one or more resources utilized to create and/or host virtual machines 336, 338, and 340.

One or more of user devices 302, 304, 306, 308, 310, and 312 may be a computing platform configured to provide a user with access to a virtual machine. In some embodiments, one or more of user devices 302, 304, 306, 308, 310, and 312 may be a desktop computer, laptop computer, mobile device, or the like (e.g., tablet device, smart phone, personal media device, etc.) configured to provide a user with access to a virtual machine. For example, user device 302 may be a computer configured to provide a user with access to virtual machine 326. In some embodiments, access to such a virtual machine may be provided via a receiver application. The receiver application may be a platform-specific or platform-agnostic application executed by the user device. Additionally or alternatively, the receiver application may be executed as part of a web-browser or web-browser plugin executed by the user device. The receiver application may provide the user with a view (e.g., a virtual or remote desktop) of a computing environment created by and executed on a computing platform distinct from the user device. For example, a receiver application executed by user device 302 may provide a user of user device 302 with a view of virtual machine 326, which may have been created by and/or be executing on virtualization platform 316, or a portion thereof.

In some embodiments, virtualization platform 316 may include load balancer 342. Load balancer 342 may be configured to utilize one or more performance metrics, parameters, or the like to allocate resources of virtualization platform 316 (e.g., resources associated with resource sets 318, 320, and 322) to one or more tasks virtualization platform 316 is handling at a particular time (e.g., tasks associated with creating and/or hosting virtual machines 324, 326, 328, 330, 332, 334, 336, 338, and 340). For example, prior to a time illustrated by FIG. 3, load balancer 342 may have utilized one or more performance metrics, parameters, or the like to allocate creation and/or hosting of virtual machines 324, 326, and 328 to resource set 318; creation and/or hosting of virtual machines 330, 332, and 334 to resource set 320; and creation and/or hosting of virtual machines 336, 338, and 340 to resource set 322.

As will be described in greater detail below, in accordance with one or more embodiments, a virtualization computing platform may host a virtual machine. For example, virtualization platform 316 may host virtual machine 326. The virtual machine may be hosted by a first set of resources of the virtualization computing platform. For example, virtual machine 326 may be hosted by resource set 318. A second set of resources for hosting the virtual machine may be identified. For example, load balancer 342 may identify resource set 320. The second set of resources may comprise resources of the virtualization computing platform that are distinct from the first set of resources. For example, resource set 320 may comprise resources of virtualization platform 316 that are distinct from resources within resource set 318. At least a portion of a plurality of files associated with the virtual machine may be copied from the first set of resources to the second set of resources. For example, a plurality of files may be associated with virtual machine 326. A portion of those files may be copied from resource set 318 to resource set 320. A virtual memory swap file may be identified from among the plurality of files associated with the virtual machine. For example, the plurality of files associated with virtual machine 326 may include one or more virtual memory swap files.

These virtual memory swap file(s) may be identified. Based on identifying the virtual memory swap file as a virtual memory swap file, the virtual memory swap file may be treated differently from one or more other of the plurality of files associated with the virtual machine. For example, based on their identification as virtual memory swap file(s), the identified virtual memory swap file(s) associated with virtual machine 326 may be treated differently from one or more other of the plurality of files associated with virtual machine 326.

FIGS. 4A, 4B, and 4C depict an example of optimized migration of a virtual machine in accordance with one or more illustrative aspects described herein. Referring to FIG. 4A, as indicated above, prior to a time illustrated by FIG. 3 (a state further depicted by FIG. 4A), load balancer 342 may have utilized one or more performance metrics, parameters, or the like to allocate creation and/or hosting of virtual machines 324, 326, and 328 to resource set 318; and creation and/or hosting of virtual machines 330, 332, and 334 to resource set 320. Subsequently, load balancer 342 may utilize one or more performance metrics, parameters, or the like to determine that virtual machines 324 and 328 should be hosted by resource set 318; and virtual machines 330, 332, 326, and 334 should be hosted by resource set 320.

In some embodiments, load balancer 342 may comprise one or more communication interfaces for communicating with one or more resource sets of virtualization platform 316. For example, load balancer 342 may include communication interface 402 for communicating with resource sets 318 and 320. Load balancer 342 may also include one or more processor(s) 404 and memory 406. Memory 406 may store one or more program modules comprising instructions that when executed by processor(s) 404 perform one or more of the functions described herein. For example, memory 406 may include migration module 408.

Returning to the illustrative scenario described above, load balancer 342 may receive one or more performance metrics, parameters, or the like from resource set 318 and/or resource set 320 via communication interface 402. Processor(s) 404 may execute one or more instructions of migration module 408 and, utilizing the performance metric(s), parameter(s), or the like received from resource set 318 and/or resource set 320, may determine that virtual machines 324 and 328 should be hosted by resource set 318; and virtual machines 330, 332, 326, and 334 should be hosted by resource set 320 (e.g., that virtual machine 326 should be "migrated" from resource set 318 to resource set 320).

As indicated above, a plurality of files may be associated with virtual machine 326. Reconfiguring virtualization platform 316 so that virtual machines 324 and 328 are hosted by resource set 318, and virtual machines 330, 332, 326, and 334 are hosted by resource set 320 (e.g., "migrating" virtual machine 326 from resource set 318 to resource set 320) may include copying at least a portion of the files associated with virtual machine 326 from resource set 318 to resource set 320. FIG. 4B, depicts such an illustrative reconfiguration (e.g., "migration") state. FIG. 4C, depicts an illustrative subsequent state in which virtualization platform 316 has been reconfigured such that virtual machines 324 and 328 are hosted by resource set 318, and virtual machines 330, 332, 326, and 334 are hosted by resource set 320 (e.g., virtual machine 326 has been "migrated" from resource set 318 to resource set 320).

FIG. 5 depicts an example virtual machine for optimized virtual machine migration in accordance with one or more illustrative aspects described herein. Referring to FIG. 5, in some embodiments, virtual machine 326 may include one or more virtual memories and/or virtual disks. For example, virtual machine 326 may include virtual memory 502 and virtual disk 504. It will be appreciated that, virtual memory 502 may appear to a user of user device 302 as an actual memory and virtual disk 504 may appear to a user of user device 302 as an actual disk, irrespective of the nature of the underlying physical resources of virtualization platform 316 utilized to store their respective contents.

Returning to the illustrative scenario described above, one or more of the files associated with virtual machine 326 may be a virtual memory swap file. For example, virtual memory 502 may include swap file 506. Swap file 506 may include one or more pointers (e.g., addresses) to one or more locations (e.g., blocks, segments, pages, or the like) associated with virtual disk 504. For example, swap file 506 may include pointers 508, 510, and 512; and pointers 508, 510, and 512 may respectively point to locations 514, 516, and 518 of virtual disk 504. In some embodiments, swap file 506 may include unutilized portion 520. Unutilized portion 520 may be a portion of swap file 506 designated for future utilization by one or more additional pointers, which may correspond to one or more additional locations (e.g., associated with virtual disk 504, or one or more additional virtual disks (not illustrated) associated with virtual machine 326).

Virtual memory 502 may also include OS 522 and/or one or more other files 524. In addition to one or more additional functions, OS 522 may be configured to provide memory-management for virtual machine 326. Other files 524 may include one or more files that are not virtual memory swap files (e.g., user data files, application files, and the like). In some embodiments, virtual memory 502 may include swap agent module 526. Swap agent module 526 may comprise instructions that when executed by one or more virtual processors (not illustrated) of virtual machine 326 perform one or more application program interface (API) calls to OS 522. Additionally or alternatively, swap agent module 526 may comprise instructions that when executed by virtual machine 326's virtual processor(s) create a virtual machine swap file agent process, which may be executed on virtual machine 326's virtual processor(s).

Performing memory-management for virtual machine 326 may include OS 522 utilizing swap file 506 to swap one or more files from virtual memory 502 to another location for temporary storage (e.g., virtual disk 504). For example, OS 522 may determine that one or more files (e.g., a file then currently stored in virtual memory 502) is not presently needed and may swap (e.g., copy, write, or the like) the file(s) to one or more locations of virtual disk 504. OS 522 may utilize swap file 506 to store in virtual memory 502 the location to which the file(s) were swapped. For example, OS 522 may swap one or more of such file(s) from virtual memory 502 to location 514 and store pointer 508 in swap file 506. Similarly, OS 522 may swap one or more of such file(s) from virtual memory 502 to location 516 and store pointer 510 in swap file 506, and OS 522 may swap one or more of such file(s) from virtual memory 502 to location 518 and store pointer 512 in swap file 506. In the event that OS 522 subsequently determines that one or more of the swapped files is needed in virtual memory 502, OS 522 may utilize one or more of swap file 506's pointers 508, 510, and 512 to retrieve the needed swapped files from virtual disk 504.

Returning to the illustrative scenario described above, as previously indicated, reconfiguring virtualization platform 316 so that virtual machines 324 and 328 are hosted by resource set 318, and virtual machines 330, 332, 326, and 334 are hosted by resource set 320 (e.g., "migrating" virtual machine 326 from resource set 318 to resource set 320) may include copying at least a portion of the files associated with virtual machine 326 from resource set 318 to resource set 320. For example, reconfiguring virtualization platform 316 so that virtual machines 324 and 328 are hosted by resource set 318, and virtual machines 330, 332, 326, and 334 are hosted by resource set 320 (e.g., "migrating" virtual machine 326 from resource set 318 to resource set 320) may include copying at least a portion of the files stored in virtual memory 502 and/or virtual disk 504 from resource set 318 to resource set 320.

In accordance with one or more aspects, one or more virtual memory swap file(s) may be identified from among the plurality of files associated with virtual machine 326. For example, swap file 506 and/or one or more files corresponding to locations 514, 516, and/or 518 may be identified from among the plurality of files stored in virtual memory 502 and/or virtual disk 504 as virtual memory swap files. Based on their identification as virtual memory swap file(s), the identified virtual memory swap file(s) associated with virtual machine 326 (e.g., swap file 506 and/or the one or more files corresponding to locations 514, 516, and/or 518) may be treated differently from one or more other of the plurality of files associated with virtual machine 326 (e.g., other files 524, and/or one or more other files of virtual disk 504).

In some embodiments, a current utilization of the virtual memory swap file may be determined. For example, load balancer 342 may determine the current utilization of swap file 506. Determining the current utilization of swap file 506 may include making one or more API calls to OS 522 of virtual machine 326 (e.g., via swap agent module 526). For example, load balancer 342 may determine, based on one or more values returned by the API calls made to OS 522, that swap file 506 is not currently being utilized by OS 522. Based on determining that swap file 506 is not currently being utilized by OS 522, load balancer 342 may copy other files 524, and/or the one or more other files of virtual disk 504 from resource set 318 to resource set 320, but fail to copy swap file 506 and/or the one or more files corresponding to locations 514, 516, and/or 518 from resource set 318 to resource set 320. Additionally or alternatively, based on determining that swap file 506 is not currently being utilized by OS 522, load balancer 342 may delay copying of swap file 506 and/or the one or more files corresponding to locations 514, 516, and/or 518 from resource set 318 to resource set 320 until other files 524, and/or the one or more other files of virtual disk 504 have been copied from resource set 318 to resource set 320.

In some embodiments, a historical utilization of the virtual memory swap file may be determined. For example, load balancer 342 may determine a historical utilization of swap file 506. Determining the historical utilization of swap file 506 may include making one or more API calls to OS 522 of virtual machine 326 (e.g., via swap agent module 526). For example, load balancer 342 may determine, based on one or more values returned by the API calls made to OS 522, that swap file 506 has not recently been utilized by OS 522. Based on determining that swap file 506 has not recently been utilized by OS 522, load balancer 342 may copy other files 524, and/or the one or more other files of virtual disk 504 from resource set 318 to resource set 320, but fail to copy swap file 506 and/or the one or more files corresponding to locations 514, 516, and/or 518 from resource set 318 to resource set 320. Additionally or alternatively, based on determining that swap file 506 has not recently been utilized by OS 522, load balancer 342 may delay copying of swap file 506 and/or the one or more files corresponding to locations 514, 516, and/or 518 from resource set 318 to resource set 320 until other files 524, and/or the one or more other files of virtual disk 504 have been copied from resource set 318 to resource set 320.

In some embodiments, a utilized portion of the virtual memory swap file and an unutilized portion of the virtual memory swap file may be identified. For example, load balancer 342 may identify a portion of swap file 506 comprising pointers 508, 510, and 512 as utilized; and unutilized portion 520 of swap file 506 as unutilized. Load balancer 342 may copy the portion of swap file 506 comprising pointers 508, 510, and 512 from resource set 318 to resource set 320, and may fail to copy unutilized portion 520 from resource set 318 to resource set 320.

In some embodiments, load balancer 342 may signal virtual machine 326 (e.g., via a virtual machine swap file agent process executing on virtual machine 326's virtual processor(s)) that at least a portion of the plurality of files associated with virtual machine 326 are to be copied from resource set 318 to resource set 320 (e.g., that virtual machine 326 is about to be "migrated" from resource set 318 to resource set 320). Responsive to the signaling, virtual machine 326 may take one or more steps to reduce utilization of swap file 506 (e.g., OS 522 may utilize one or more of swap file 506's pointers 508, 510, and 512 to retrieve one or more swapped files that may be needed from virtual disk 504 in the future).

In some embodiments, load balancer 342 may receive a message from virtual machine 326 (e.g., via a virtual machine swap file agent process executing on virtual machine 326's virtual processor(s)). The message may indicate that swap file 506 is not currently being utilized. Based on the message indicating that swap file 506 is not currently being utilized, load balancer 342 may copy other files 524, and/or the one or more other files of virtual disk 504 from resource set 318 to resource set 320, but fail to copy swap file 506 and/or the one or more files corresponding to locations 514, 516, and/or 518 from resource set 318 to resource set 320. Additionally or alternatively, the message may indicate a predicted duration that swap file 506 will continue to be utilized by OS 522. Based on the message indicating the predicted duration that swap file 506 will continue to be utilized by OS 522, load balancer 342 may delay copying swap file 506 and/or the one or more files corresponding to locations 514, 516, and/or 518 from resource set 318 to resource set 320 for at least the predicted duration that swap file 506 will continue to be utilized by OS 522.

In some embodiments, load balancer 342 may receive two messages from virtual machine 326 (e.g., via a virtual machine swap file agent process executing on virtual machine 326's virtual processor(s)). A first message may indicate that swap file 506 is currently being utilized by OS 522. A second, subsequently received, message may indicate that swap file 506 is no longer being utilized by OS 522. Based on the first message indicating that swap file 506 is currently being utilized by OS 522, load balancer 342 may copy other files 524, and/or the one or more other files of virtual disk 504 from resource set 318 to resource set 320, but fail to copy swap file 506 and/or the one or more files corresponding to locations 514, 516, and/or 518 from resource set 318 to resource set 320 until the second message indicating that swap file 506 is no longer being utilized by OS 522 is received.

In some embodiments, load balancer 342 may retain a copy of swap file 506 and/or the one or more files corresponding to locations 514, 516, and/or 518 on resource set 318, and load balancer 342 may remove other files 524, and/or the one or more other files of virtual disk 504 from resource set 318. Subsequent to removing other files 524, and/or the one or more other files of virtual disk 504 from resource set 318, load balancer 342 may copy a portion of the retained copy of swap file 506 and/or the one or more files corresponding to locations 514, 516, and/or 518 on resource set 318 to resource set 320 (e.g., in the event that OS 522 determines that one or more of swap file 506 and/or the one or more files corresponding to locations 514, 516, and/or 518 is needed in virtual memory 502).

FIG. 6 depicts an example method for optimized virtual machine migration in accordance with one or more illustrative aspects described herein. Referring to FIG. 6, at step 602, a virtualization computing platform may host a virtual machine. For example, virtualization platform 316 may host virtual machine 326. The virtual machine may be hosted by a first set of resources of the virtualization computing platform. For example, virtualization platform 316 may host virtual machine 326 using resource set 318. At step 604, a second set of resources for hosting the virtual machine may be identified. For example, resource set 320 may be identified for hosting virtual machine 326. The second set of resources may comprise resources of the virtualization computing platform that are distinct from the first set of resources. For example, resource set 320 may comprise resources of virtualization platform 316 that are distinct from resources within resource set 318. At step 606, at least a portion of a plurality of files associated with the virtual machine may be copied from the first set of resources to the second set of resources. For example, at least a portion of the files stored in virtual memory 502 and/or virtual disk 504 may be copied from resource set 318 to resource set 320. At step 608, a virtual memory swap file may be identified from among the plurality of files associated with the virtual machine. For example, swap file 506 and/or one or more files corresponding to locations 514, 516, and/or 518 may be identified. At step 610, based on identifying the virtual memory swap file as a virtual memory swap file, the virtual memory swap file may be treated differently from one or more other of the plurality of files associated with the virtual machine. For example, based on identifying that swap file 506 is a virtual memory swap file, load balancer 342 may copy other files 524, and/or one or more other files of virtual disk 504 from resource set 318 to resource set 320, but fail to copy swap file 506 and/or one or more files corresponding to locations 514, 516, and/or 518 from resource set 318 to resource set 320.

The allocation of functionality described herein to one or more elements (e.g., load balancer 342) is merely for simplicity of illustration of one or more depicted example embodiments of the instant disclosure. Any of the functionality described herein may be separated or combined, and/or allocated to one or more various computing platforms, physical or virtual, or components thereof, as desired. For example, one or more aspects of the described functionality of load balancer 342 may be performed by one or more other elements distinct from load balancer 342, or any combination thereof (e.g., tools stack 224 (described above with respect to FIG. 2) may perform one or more aspects of load balancer 342's functionality described herein). Similarly, one or more files associated with a virtual machine may be copied from one resource set to another within a virtualization platform (e.g., a virtual machine may be migrated from one resource set to another) for one or more additional or alternative purposes other than load balancing per se. For example, a virtual machine may be migrated as part of a consolidation of one or more virtual machines to a particular resource set (e.g., to reduce power consumption); a virtual machine may be migrated from a resource set in order to allow for the replacement and/or maintenance of resources associated with the resource set (e.g., software, hardware, etc.); and/or a virtual machine may be migrated from a resource set associated with a public domain (e.g., a public "cloud") to a resource set associated with a private domain (e.g., a private "cloud"), or vice versa.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

What is claimed is:

1. A method comprising:
   hosting, by a first set of resources of a virtualization computing platform, a virtual machine;
   identifying a second set of resources of the virtualization computing platform for hosting the virtual machine, the second set of resources comprising resources distinct from the first set of resources and to which the virtual machine is to be migrated;
   copying at least a portion of a plurality of files associated with the virtual machine from the first set of resources to the second set of resources;
   identifying, from amongst the plurality of files, a virtual memory swap file;
   receiving, from the virtual machine, a first message and a second message, the first message being received before the second message and indicating that the virtual memory swap file is currently being utilized, and the second message indicating that the virtual memory swap file is no longer being utilized;
   based on the first message, copying one or more files, of the plurality of files, other than the virtual memory swap file, from the first set of resources to the second set of resources; and
   failing to copy the virtual memory swap file from the first set of resources to the second set of resources until the second message is received.

2. The method of claim 1, comprising delaying copying of at least a portion of the virtual memory swap file to the second set of resources until the one or more files have been copied to the second set of resources.

3. The method of claim 1, comprising:
   identifying a utilized portion of the virtual memory swap file and an unutilized portion of the virtual memory swap file;
   copying the utilized portion of the virtual memory swap file to the second set of resources; and
   failing to copy the unutilized portion of the virtual memory swap file to the second set of resources.

4. The method of claim 1, comprising signaling the virtual machine that at least a portion of the plurality of files are to be copied from the first set of resources to the second set of resources, wherein the virtual machine is configured to reduce utilization of the virtual memory swap file in response to the signaling.

5. The method of claim 1, comprising, based on a message, received from the virtual machine, indicating a predicted duration that the virtual memory swap file will continue to be utilized, delaying copying of at least a portion of the virtual memory swap file for at least the predicted duration.

6. The method of claim 1, comprising delaying, based on at least one value returned by one or more application program interface (API) calls made by a swap file agent executing on the virtual machine to an operating system (OS) of the virtual machine, copying of at least a portion of the virtual memory swap file to the second set of resources.

7. A system comprising:
   at least one processor; and
   a memory comprising instructions that when executed by the at least one processor cause the system to:
      host, using a first set of resources of a virtualization computing platform, a virtual machine;
      identify a second set of resources of the virtualization computing platform for hosting the virtual machine, the second set of resources comprising resources distinct from the first set of resources and to which the virtual machine is to be migrated;
      copy at least a portion of a plurality of files associated with the virtual machine from the first set of resources to the second set of resources;
      identify, from amongst the plurality of files, a virtual memory swap file;
      receive, from the virtual machine, a first message and a second message, the first message being received before the second message and indicating that the virtual memory swap file is currently being utilized, and the second message indicating that the virtual memory swap file is no longer being utilized;
      based on the first message, copy one or more files, of the plurality of files, other than the virtual memory swap file, from the first set of resources to the second set of resources; and
      fail to copy the virtual memory swap file from the first set of resources to the second set of resources until the second message is received.

8. The system of claim 7, wherein the instructions, when executed by the at least one processor, cause the system to delay copying of at least a portion of the virtual memory swap file to the second set of resources until the one or more files have been copied to the second set of resources.

9. The system of claim 7, wherein the instructions, when executed by the at least one processor, cause the system to:
   identify a utilized portion of the virtual memory swap file and an unutilized portion of the virtual memory swap file;
   copy the utilized portion of the virtual memory swap file to the second set of resources; and
   fail to copy the unutilized portion of the virtual memory swap file to the second set of resources.

10. The system of claim 7, wherein the instructions, when executed by the at least one processor, cause the system to signal the virtual machine that at least a portion of the plurality of files are to be copied from the first set of resources to the second set of resources, and wherein the virtual machine is configured to reduce utilization of the virtual memory swap file in response to the signal.

11. The system of claim 7, wherein the instructions, when executed by the at least one processor, cause the system to, based on a message, received from the virtual machine, indicating a predicted duration that the virtual memory swap file will continue to be utilized, delay copying of at least a portion of the virtual memory swap file for at least the predicted duration.

12. The system of claim 7, wherein the instructions, when executed by the at least one processor, cause the system to delay, based on at least one value returned by one or more application program interface (API) calls made by a swap file agent executing on the virtual machine to an operating system (OS) of the virtual machine, copying of at least a portion of the virtual memory swap file to the second set of resources.

13. One or more non-transitory computer-readable media comprising instructions that when executed by one or more computers cause the one or more computers to:
   host, using a first set of resources of a virtualization computing platform, a virtual machine;
   identify a second set of resources of the virtualization computing platform for hosting the virtual machine, the second set of resources comprising resources distinct from the first set of resources and to which the virtual machine is to be migrated;
   copy at least a portion of a plurality of files associated with the virtual machine from the first set of resources to the second set of resources;
   identify, from amongst the plurality of files, a virtual memory swap file;
   receive, from the virtual machine, a first message and a second message, the first message being received before the second message and indicating that the virtual memory swap file is currently being utilized, and the second message indicating that the virtual memory swap file is no longer being utilized;
   based on the first message, copy one or more files, of the plurality of files, other than the virtual memory swap file, from the first set of resources to the second set of resources; and
   fail to copy the virtual memory swap file from the first set of resources to the second set of resources until the second message is received.

14. The one or more non-transitory computer-readable media of claim 13, wherein the instructions, when executed by the one or more computers, cause the one or more computers to delay copying of at least a portion of the virtual memory swap file to the second set of resources until the one or more files have been copied to the second set of resources.

15. The one or more non-transitory computer-readable media of claim 13, wherein the instructions, when executed by the one or more computers, cause the one or more computers to:
   identify a utilized portion of the virtual memory swap file and an unutilized portion of the virtual memory swap file;
   copy the utilized portion of the virtual memory swap file to the second set of resources; and
   fail to copy the unutilized portion of the virtual memory swap file to the second set of resources.

16. The one or more non-transitory computer-readable media of claim 13, wherein the instructions, when executed by the one or more computers, cause the one or more computers to signal the virtual machine that at least a portion of the plurality of files are to be copied from the first set of resources to the second set of resources, and wherein the virtual machine is configured to reduce utilization of the virtual memory swap file in response to the signal.

17. The one or more non-transitory computer-readable media of claim 13, wherein the instructions, when executed by the one or more computers, cause the one or more computers to, based on a message, received from the virtual machine, indicating a predicted duration that the virtual memory swap file will continue to be utilized, delay copying of at least a portion of the virtual memory swap file for at least the predicted duration.

18. The one or more non-transitory computer-readable media of claim 13, wherein the instructions, when executed by the one or more computers, cause the one or more computers to delay, based on at least one value returned by one or more application program interface (API) calls made by a swap file agent executing on the virtual machine to an operating system (OS) of the virtual machine, copying of at least a portion of the virtual memory swap file to the second set of resources.

19. A method comprising:
hosting, by a first set of resources of a virtualization computing platform, a virtual machine;
identifying a second set of resources of the virtualization computing platform for hosting the virtual machine, the second set of resources comprising resources distinct from the first set of resources and to which the virtual machine is to be migrated;
copying at least a portion of a plurality of files associated with the virtual machine from the first set of resources to the second set of resources;
identifying, from amongst the plurality of files, a virtual memory swap file;
retaining, on the first set of resources, a copy of the virtual memory swap file;
removing one or more files, of the plurality of files, other than the virtual memory swap file, from the first set of resources; and
subsequent to the removing, copying at least a portion of the virtual memory swap file from the copy of the virtual memory swap file retained on the first set of resources to the second set of resources.

20. The method of claim 19, comprising:
identifying a utilized portion of the virtual memory swap file and an unutilized portion of the virtual memory swap file;
copying the utilized portion of the virtual memory swap file to the second set of resources; and
failing to copy the unutilized portion of the virtual memory swap file to the second set of resources.

21. The method of claim 19, comprising signaling the virtual machine that at least a portion of the plurality of files are to be copied from the first set of resources to the second set of resources, wherein the virtual machine is configured to reduce utilization of the virtual memory swap file in response to the signaling.

22. The method of claim 19, comprising, based on a message, received from the virtual machine, indicating a predicted duration that the virtual memory swap file will continue to be utilized, delaying copying of the at least a portion of the virtual memory swap file for at least the predicted duration.

23. The method of claim 19, comprising delaying, based on at least one value returned by one or more application program interface (API) calls made by a swap file agent executing on the virtual machine to an operating system (OS) of the virtual machine, copying of the at least a portion of the virtual memory swap file to the second set of resources.

24. The method of claim 19, comprising, based on a message, received from the virtual machine, indicating that the virtual memory swap file is currently being utilized:
copying the one or more files from the first set of resources to the second set of resources; and
failing to copy the virtual memory swap file from the first set of resources to the second set of resources until a message indicating that the virtual memory swap file is no longer being utilized is received from the virtual machine.

25. A system comprising:
at least one processor; and
a memory comprising instructions that when executed by the at least one processor cause the system to:
host, using a first set of resources of a virtualization computing platform, a virtual machine;
identify a second set of resources of the virtualization computing platform for hosting the virtual machine, the second set of resources comprising resources distinct from the first set of resources and to which the virtual machine is to be migrated;
copy at least a portion of a plurality of files associated with the virtual machine from the first set of resources to the second set of resources;
identify, from amongst the plurality of files, a virtual memory swap file;
retain, on the first set of resources, a copy of the virtual memory swap file;
remove one or more files, of the plurality of files, other than the virtual memory swap file from the first set of resources; and
subsequent to removing the one or more files from the first set of resources, copy at least a portion of the virtual memory swap file from the copy of the virtual memory swap file retained on the first set of resources to the second set of resources.

26. The system of claim 25, wherein the instructions, when executed by the at least one processor, cause the system to:
identify a utilized portion of the virtual memory swap file and an unutilized portion of the virtual memory swap file;
copy the utilized portion of the virtual memory swap file to the second set of resources; and
fail to copy the unutilized portion of the virtual memory swap file to the second set of resources.

27. The system of claim 25, wherein the instructions, when executed by the at least one processor, cause the system to signal the virtual machine that at least a portion of the plurality of files are to be copied from the first set of resources to the second set of resources, and wherein the virtual machine is configured to reduce utilization of the virtual memory swap file in response to the signal.

28. The system of claim 25, wherein the instructions, when executed by the at least one processor, cause the system to, based on a message, received from the virtual machine, indicating a predicted duration that the virtual memory swap file will continue to be utilized, delay copying of the at least a portion of the virtual memory swap file for at least the predicted duration.

29. The system of claim 25, wherein the instructions, when executed by the at least one processor, cause the system to delay, based on at least one value returned by one or more application program interface (API) calls made by a swap file agent executing on the virtual machine to an operating system (OS) of the virtual machine, copying of the at least a portion of the virtual memory swap file to the second set of resources.

30. The system of claim 25, wherein the instructions, when executed by the at least one processor, cause the system to, based on a message, received from the virtual machine, indicating that the virtual memory swap file is currently being utilized:
copy the one or more files from the first set of resources to the second set of resources; and fail to copy the virtual memory swap file from the first set of resources to the second set of resources until a message indicating that the virtual memory swap file is no longer being utilized is received from the virtual machine.

31. One or more non-transitory computer-readable media comprising instructions that when executed by one or more computers cause the one or more computers to:
　host, using a first set of resources of a virtualization computing platform, a virtual machine;
　identify a second set of resources of the virtualization computing platform for hosting the virtual machine, the second set of resources comprising resources distinct from the first set of resources and to which the virtual machine is to be migrated;
　copy at least a portion of a plurality of files associated with the virtual machine from the first set of resources to the second set of resources;
　identify, from amongst the plurality of files, a virtual memory swap file;
　retain, on the first set of resources, a copy of the virtual memory swap file;
　remove one or more files, of the plurality of files, other than the virtual memory swap file, from the first set of resources; and
　subsequent to removing the one or more files from the first set of resources, copy at least a portion of the virtual memory swap file from the copy of the virtual memory swap file retained on the first set of resources to the second set of resources.

32. The one or more non-transitory computer-readable media of claim 31, wherein the instructions, when executed by the one or more computers, cause the one or more computers to:
　identify a utilized portion of the virtual memory swap file and an unutilized portion of the virtual memory swap file;
　copy the utilized portion of the virtual memory swap file to the second set of resources; and
　fail to copy the unutilized portion of the virtual memory swap file to the second set of resources.

33. The one or more non-transitory computer-readable media of claim 31, wherein the instructions, when executed by the one or more computers, cause the one or more computers to signal the virtual machine that at least a portion of the plurality of files are to be copied from the first set of resources to the second set of resources, and wherein the virtual machine is configured to reduce utilization of the virtual memory swap file in response to the signal.

34. The one or more non-transitory computer-readable media of claim 31, wherein the instructions, when executed by the one or more computers, cause the one or more computers to, based on a message, received from the virtual machine, indicating a predicted duration that the virtual memory swap file will continue to be utilized, delay copying of the at least a portion of the virtual memory swap file for at least the predicted duration.

35. The one or more non-transitory computer-readable media of claim 31, wherein the instructions, when executed by the one or more computers, cause the one or more computers to delay, based on at least one value returned by one or more application program interface (API) calls made by a swap file agent executing on the virtual machine to an operating system (OS) of the virtual machine, copying of the at least a portion of the virtual memory swap file to the second set of resources.

36. The one or more non-transitory computer-readable media of claim 31, wherein the instructions, when executed by the one or more computers, cause the one or more computers to, based on a message, received from the virtual machine, indicating that the virtual memory swap file is currently being utilized:
　copy the one or more files from the first set of resources to the second set of resources; and
　fail to copy the virtual memory swap file from the first set of resources to the second set of resources until a message indicating that the virtual memory swap file is no longer being utilized is received from the virtual machine.

* * * * *